March 21, 1967   W. DIELLO   3,310,722
DIRECT CURRENT MOTOR SPEED CONTROL WITH DIODE
Filed Aug. 21, 1964

INVENTOR.
WILLIAM DIELLO
BY
Souther, Stoltenberg & Barr
ATTORNEYS

United States Patent Office 3,310,722
Patented Mar. 21, 1967

3,310,722
DIRECT CURRENT MOTOR SPEED CONTROL WITH DIODE
William Diello, Syracuse, N.Y., assignor to Eltra Corporation, Brooklyn, N.Y., a corporation of New York
Filed Aug. 21, 1964, Ser. No. 391,154
6 Claims. (Cl. 318—361)

This invention relates to speed controls for direct-current electric motors, more particularly to small direct-current motors provided with a third-brush construction including either a permanent magnet field or a wound field coil in shunt relation to the rotating armature.

In the past, many attempts have been made to efficiently control the speed of shunt-wound direct-current motors which usually involved a variable resistor in the field circuit of the motor. The use of a variable resistance in this position controlled the flow of current to the shunt field and resulted in the loss of flux to decrease the motor efficiency, particularly, in the top half of the performance range. The use of thermonic control devices have also been suggested for this purpose, but it was found to be too cumbersome and expensive to make it feasible from the commercial aspect. The motor speed was also controlled by the use of a shifting brush arrangement which changed the magnetic relations of the armature with reference to the field to control the speed, but this, again, was found impracticable due to the intricacies of the mechanism which often resulted in the failure of the movable brush rigging.

The present invention contemplates the provision of a speed control for small motors, particularly, useful in connection with windshield wiper motors which utilizes a third-brush in combination with a diode and a variable resistance to control the flow of current through the armature to control the speed of the motor. This concept is applicable both to a motor which utilizes a permanent-magnet field, or a wound-type field. The flow of current from an energy source to the third brush is controlled by a rheostatic device and the flow of current to the adjacent main brush is maintained in a unilateral direction by a diode in this case which allows the current from the energy source to energise the armature by flowing into the main brush, but will block the reverse current flow from the armature back E.M.F. in the opposite direction through the same main brush.

It is, therefore, a principal object of this invention to provide a speed control for direct-current motors which utilizes three brushes cooperating with the armature wherein a variable resistance device controls the flow of current to the third brush, while a diode controls the flow of current to the armature in a unilateral direction through the adjacent main brush.

It is a further object of this invention to provide a speed control for direct-current motors which does not impair but improves the efficiency of the motor, particularly, at the high load end of its performance range, thereby improving the overall efficiency of the motor under operating conditions.

It is a further object of this invention to provide a speed control for a direct-current motor which is applicable to both a motor having a permanent magnet field and a motor having a wound-field wherein the speed is controlled by an adjustable rheostat with a diode cooperating therewith.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

Referring to the drawings.

Figure 1:
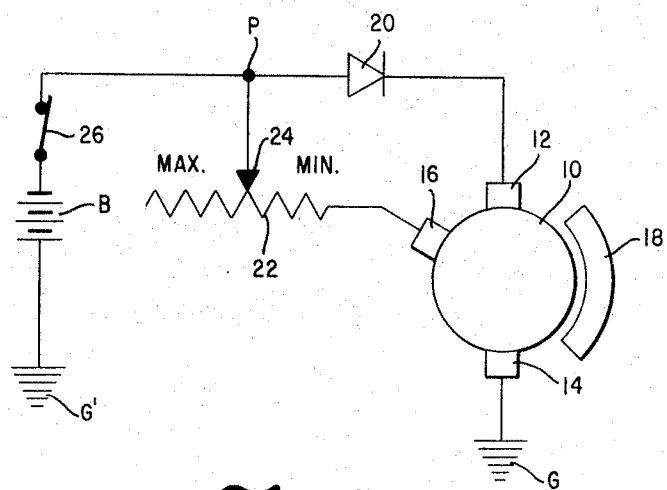
FIG. 1 is a schematic diagram of connections applying the principle of the invention to a permanent magnet motor.

Referring to FIG. 1 of the drawings, a conventional armature 10 is shown having conventional brushes 12 and 14 cooperating with a conventional commutator in a diametrically disposed relation with reference to each other and a third brush 16 located in a predetermined annular relation with reference to the main brushes 12 and 14. A permanent magnet field member 18 is mounted in any convenient manner to cooperate with the armature 10. The assembly of these conventional components becomes unique when connected in electrical circuit with a unilateral current conductor 20 such as a diode and a variable resistor 22 as shown in FIGURE 1. The brush 14 is grounded as G as shown with the upper brush 12 being connected in circuit with the diode 20 so that the current may flow for a source of energy B to the brush 12 from the diode 20 but not in the opposite direction. The third brush 16 is in circuit with the variable resistance 22 which is provided with a sliding contact 24 connected at point P in the circuit behind the diode 20. The power circuit is controlled by a manual switch 26 which leads to the battery B, the source of electrical energy, one terminal of which is grounded at G' in the usual manner. The component parts utilized in this motor and its electrical circuit are all conventional and are readily available in the open market.

The battery B provides energy to operate the motor with the armature 10 cooperating magnetically with the permanent magnet field member 18 in the well-known manner. With the slidable contact 24, positioned at the left end (FIG. 1) of the resistance 22 so as to place maximum resistance in the circuit between the battery and the third brush 16, the current will flow from the battery through the switch 26, through the diode 20 into the armature through the brush 12 thence to the ground by the brush 14 to complete a normal motor circuit. The current flowing through the brush 16 by way of the variable resistance 22 will be in proportion to the ratio of armature resistance to the variable resistance 22 and to the back E.M.F. created by the rotating armature 10 under the influence of the permanent magnet field 18. With the maximum amount of resistance 22 in the circuit with the brush 16, this current will be a minimum and the motor will run at its lowest speed for any given load.

If the slidable contact 24 of the variable resistance 22 is moved to the right to the minimum position, the brushes 12 and 16 will be shorted together through the diode 20, thereby reducing the number of effective armature turns so that it produces a lower back E.M.F. allowing more current to flow through the brushes 12 and 16 resulting in an increase in speed. As the speed of the armature 10 increases, a back E.M.F. at the brush 12 also increases to a point where the applied voltage from the battery B and the generated back E.M.F. tend to equalize to prevent any current flow through the diode 20 and through the brush 12, so that all of the current passing through the armature flows through the movable contact 24 to the minimum resistance 22, through the brush 16 and to ground through the lower brush 14. This results in a further increase in speed of the armature which again increases the back E.M.F. generated by the armature at the brush 12, but due to the presence of the blocking diode 20, no current will flow out of the brush 12 into the power circuit. Under these conditions, the armature speed will rise to its highest value for a given load as compared with the conditions described in the previous paragraphs where sliding contact was in maximum resistance position on the variable resistance 22 to provide the lowest possible speed for the given load.

The intermediate positions of the sliding contact 24 between maximum and minimum positions will vary the speed from the lowest speed which is found with the sliding contact with the maximum position to a condition of highest speed which is attained when the sliding contact 24 is moved to the minimum position of resistance.

Figure 2:
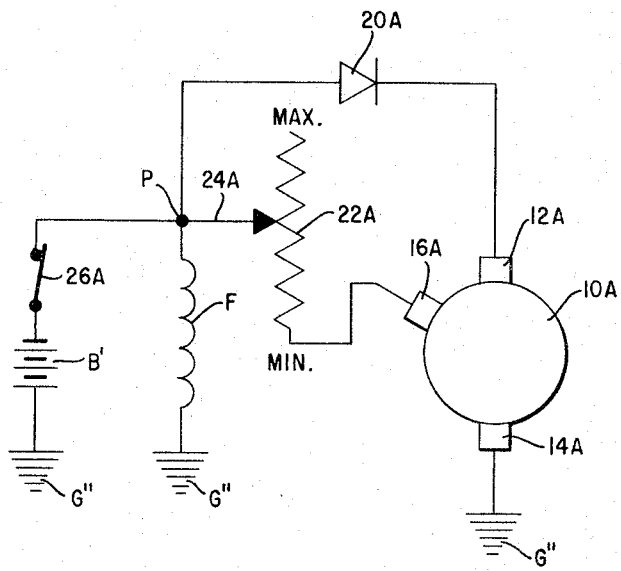
FIG. 2 is a schematic diagram of connections showing the invention applied to a shunt-field direct-current motor.

Referring now to FIG. 2, a conventional armature 10A is shown having a commutator with which conventional upper brush 12A and lower grounded brush 14A cooperate and also a third brush 16A in the same manner as has already been described with the modification shown in FIG. 1. The diode 20A is connected in the same manner to the upper main brush 12A and is again in circuit with a movable contact 24A of a variable resistance 22A which is connected at its one end to the third brush 16A, the slidable contact being connected to point P which is in circuit with a manual switch 26A connected to the battery B', both of which are grounded at G". The field coil F of the motor is connected to point P at one end being grounded at its opposite end at G" to provide a shunt connected field for the armature 10A.

The details of construction in this modification are again conventional and may take a number of different forms as are well known in the art and will therefore not be described in further detail.

The action of the armature 10A of the motor under the magnetic influence of the shunt field F which is energized at substantially the terminal potential of the battery B', is substantially the same as that described with reference to the permanent magnet motor shown and disclosed in FIG. 1. With the sliding contact 24A in FIG. 2 at the maximum position, which provides the largest amount of resistance in the motor circuit, the speed of the motor will be at its lowest and as the sliding contact 24A is moved across the resistance 22A to reduce the resistance, until it reaches the minimum (lower) position, the speed of the motor will continuously increase for a given load until the highest speed is reached when the sliding contact reaches the minimum position of resistance.

Comparative tests between a motor incorporating the invention shown in FIGS. 1 and 2 against a conventional motor of substantially the same size, shows that the high speed stall torque of the motors incorporating the invention is 23% higher than the high speed stall torque of the conventional motor. Under the same circumstances, the low speed stall torque of a motor incorporating the invention is 5% higher than the low speed stall torque of a conventional motor. It will be noted that the low speed performance of the motors incorporating the invention is not appreciably changed with reference to the performance of the conventional motor. It is at the high load end of the performance that the improvement in efficiency is very noticeable and improved high speed performance is attained without any additional power input as compared with a conventional motor. This improved performance at the high load end also has an influence on the cost of fabricating motors of this type. In a conventional motor having a variable resistance in the motor field circuit, this method of speed control has resulted in a loss of flux and decreased motor efficiencies at the upper end of the performance range. This is not the case in motors utilizing the invention disclosed herein, so that a designer is given the opportunity to provide a predetermined motor performance for a given application by reducing the length of the stack laminations for a given motor, due to the increased efficiency available at the high load end of the performance curves.

It is to be understood that the above-detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a D.C. motor having a magnetic field circuit and an armature cooperating therewith provided with a commutator, a pair of main brushes contacting the commutator at approximately the neutral axis for operating the motor at a relatively low speed, a third brush contacting the commutator at a position between the first two brushes, a diode in circuit with a first of said main brushes, polarized to allow electric current to flow toward said brush, and a variable resistance in circuit with the third brush, the diode and the first of said main brushes, whereby the speed of the motor may be increased by reducing the effective turns of the armature.

2. In a D.C. motor having a magnetic field circuit and an armature cooperating therewith provided with a commutator, a pair of main brushes contacting the commutator at approximately the neutral axis for operating the motor at a relatively low speed, a third brush contacting the commutator at a predetermined position between the first two brushes, a diode in circuit with a first of said main brushes, polarized to allow electric current from a source of energy to flow toward said brush, and a variable resistance in circuit with the third brush, the diode and the first of said main brushes, whereby the flow of current can be controlled to flow to the main and third brush so that the speed of the motor may be controlled.

3. In a D.C. motor having a magnetic field circuit and an armature cooperating therewith provided with a commutator, a pair of main brushes contacting the commutator at approximately the neutral axis for operating the motor at a relatively low speed, a third brush contacting the commutator at a predetermined position between the first two brushes, a diode in circuit with a first of said main brushes and a source of energy, polarized to allow electric current to flow toward said brush, and a variable resistance in circuit with the source of energy and the third brush to control the current flowing through the third brush and the diode, whereby a change from a maximum to a minimum resistive value of the variable resistance, the speed of the motor may be increased.

4. In a D.C. motor having a magnetic field circuit and an armature cooperating therewith provided with a commutator, a pair of main brushes contacting the commutator at approximately the neutral axis for operating the motor at a relatively low speed, a third brush contacting the commutator at a predetermined position between the first two brushes, a diode in circuit with a source of energy and a first of said main brushes, polarized to allow electric current to flow toward said brush, and a variable resistance in circuit with the source of energy, the third brush, the diode and the first of said main brushes, whereby the amount of the flow of current to the armature and the number of the effective turns of the armature may be controlled to vary the speed of the motor.

5. The motor defined in claim 4 further characterized by having the magnetic field circuit created by a permanent magnet.

6. The motor defined in claim 4 further characterized by having the magnetic field circuit created by a shunt field winding.

(References on following page)

References Cited by the Examiner

UNITED STATES PATENTS

| | | | |
|---|---|---|---|
| 1,227,400 | 5/1917 | Dolivo-Dobrowolsky | 318—340 |
| 1,325,677 | 12/1919 | Midgley | 318—541 X |
| 1,736,844 | 11/1929 | Buchenberg | 310—148 X |
| 1,796,193 | 3/1931 | Eaton | 310—148 X |
| 1,829,872 | 11/1931 | Oswald | 318—361 |
| 1,961,940 | 6/1934 | O'Hagan | 318—331 X |
| 2,135,260 | 11/1938 | Norcross | 318—361 X |
| 2,144,575 | 1/1939 | Murphy | 318—390 X |
| 2,469,382 | 5/1949 | Gayley | 318—340 X |
| 2,774,925 | 12/1956 | Wagner | 318—361 X |
| 2,786,173 | 3/1957 | Martin et al. | 318—349 X |
| 3,221,234 | 11/1965 | Ault | 318—331 X |

ORIS L. RADER, *Primary Examiner.*

J. C. BERENZWEIG, *Assistant Examiner.*